(12) United States Patent
Karlsson et al.

(10) Patent No.: US 7,884,880 B2
(45) Date of Patent: Feb. 8, 2011

(54) SHUTTER ARRANGEMENT FOR COVERING A CAMERA LENS

(75) Inventors: Maiko Karlsson, Malmö (SE); Mikael Hansson, Kävlinge (SE); Henrik Fristedt, Karlshamn (SE); Ola Carmonius, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 453 days.

(21) Appl. No.: 11/924,938

(22) Filed: Oct. 26, 2007

(65) Prior Publication Data

US 2009/0073310 A1    Mar. 19, 2009

Related U.S. Application Data

(60) Provisional application No. 60/973,257, filed on Sep. 18, 2007.

(51) Int. Cl.
*H04N 5/225* (2006.01)
*G03B 17/00* (2006.01)

(52) U.S. Cl. .......................... 348/374; 396/448; 396/449
(58) Field of Classification Search .................. 348/374
See application file for complete search history.

(56) References Cited

U.S. PATENT DOCUMENTS

| | | | | |
|---|---|---|---|---|
| 2,495,223 A | * | 1/1950 | Bodlander | .................. 396/348 |
| 5,541,696 A | * | 7/1996 | Bittner | ........................ 396/448 |
| 5,913,089 A | * | 6/1999 | Ebe | ............................ 396/448 |
| 6,151,455 A | * | 11/2000 | Mikami et al. | .............. 396/205 |
| 6,305,852 B1 | | 10/2001 | Suzuki et al. | |
| 7,092,627 B2 | * | 8/2006 | Ushiro | ....................... 396/303 |
| 7,722,263 B2 | * | 5/2010 | Izumi et al. | .................. 396/349 |
| 2004/0041935 A1 | * | 3/2004 | Nagamine et al. | ........... 348/335 |
| 2009/0279884 A1 | * | 11/2009 | Matsumoto | .................. 396/448 |

FOREIGN PATENT DOCUMENTS

| | | |
|---|---|---|
| EP | 1 788 808 A1 | 5/2007 |
| JP | 02-058037 A | 2/1990 |
| JP | 08-278530 A | 10/1996 |

OTHER PUBLICATIONS

PCT International Search Report and Written Opinion of the International Searching Authority, corresponding to PCT/EP2008/053152, mailed Sep. 15, 2008, 10 pages.

* cited by examiner

*Primary Examiner*—Ngoc-Yen T Vu
(74) *Attorney, Agent, or Firm*—Harrity & Harrity, LLP

(57) ABSTRACT

A shutter arrangement for covering a camera lens includes a camera lens cover that is movable in a plane along a first direction between a first closed position and a second opened position. In the first closed position, the camera lens cover substantially covers the camera lens and in the second opened position, the camera lens is substantially uncovered. The shutter arrangement also includes a movable cover that moves between a first position and a second position which displaces the movable cover from the plane.

14 Claims, 8 Drawing Sheets

SHUTTER ARRANGEMENT FOR COVERING A CAMERA LENS

RELATED APPLICATION

This application claims priority under 35 U.S.C. §119 based on U.S. Provisional Application Ser. No. 60/973,257, filed Sep. 18, 2007, the disclosure of which is hereby incorporated herein by reference.

TECHNICAL FIELD

The present invention relates to a shutter arrangement for at least partly covering a camera lens. The shutter arrangement is preferably arranged on a mobile phone comprising a camera.

BACKGROUND OF THE INVENTION

Mobile phones are generally equipped with at least one camera comprising a camera lens and a shutter arrangement which covers the camera lens. A shutter arrangement is intended to protect the camera lens from disruptive forces which might harm the camera lens. A shutter arrangement is also constructed to protect the camera lens from dust, dirt, and other pollutants which may degenerate the quality of a picture taken or harm the camera lens by, e.g., imparting scratches to the surface of the camera lens.

The trend of an increasing use of, e.g., mobile phones with cameras has also led to an increasing demand on the shutter arrangements which can be exposed to a flexible life style, in the sense that the shutter arrangement should be both durable against external forces and preferably less likely to be exposed to external forces in the first place.

Hence there is a constant need for improved shutter arrangements.

SUMMARY OF THE INVENTION

At least some of the above problems, and others, are at least partly solved by the present invention. More specifically, aspects described herein provide a shutter arrangement for at least partly covering a camera lens. The shutter arrangement comprises a camera lens cover which is movable in a plane P along a first direction A between a first closed position, in which the camera lens cover substantially covers the camera lens, and a second opened position, in which the camera lens is substantially uncovered from the camera lens cover. The shutter arrangement further comprises a second movable cover which is movable between a first position, in which the second movable cover substantially intersects the plane and the first direction A, to a second position, in which the second movable cover is substantially displaced from the plane and the first direction A. Aspects described herein also provide for a shutter arrangement which significantly reduces the risk of items, e.g., clothes, getting caught in the shutter arrangement which could cause harm to the shutter arrangement or the camera lens. It also provides for a shutter arrangement which will make a housing discrete and slim, since no parts from the shutter arrangements will protrude out from the plane of the shutter arrangement.

In an embodiment of the present invention, the shutter arrangement is connected with a bias mechanism to bias the second movable cover towards the first position of the second movable cover. A bias mechanism will ease the handling of the shutter arrangement, while at the same time, relatively securely temporarily hold the camera lens cover in the second position during use of the camera. A bias mechanism according to the present invention may comprise a spring means, such as a helical spring, a bias rod, such as a flexible rod, or a compressible foam material, such as polymeric foam, or the like. Of course combinations of the above mentioned bias mechanism are also possible.

Optionally, the shutter arrangement may further comprise a lock mechanism to lock said second movable cover in its first position. A release mechanism may further be arranged to the lock mechanism, so that when the camera lens cover is moved towards its second position, the lock mechanism, which is arranged in working cooperation with the second movable cover, is disabled. The release mechanism may comprise a trigger rod which at least partly intersects the first direction A. The just mentioned solution unlocks the lock mechanism only when the camera lens cover is moved to its second position.

The shutter arrangement may also comprise a cover chamber into which said second movable cover is moved when displaced from the plane P and the first direction A. In an embodiment of the present invention, the second movable cover is displaced along a second direction B, preferably, the second direction B is in a direction substantially perpendicular to said first direction A. This permits a simple and practical construction of the cover chamber.

In an advantageous embodiment of the present invention, the second movable cover may further comprise an outer surface and the camera lens cover may comprise an outer surface. When the second movable cover and the camera lens cover are in their first positions, the outer surfaces of the second movable cover and the camera lens cover are substantially aligned.

The present invention may also include an electronic device comprising a shutter arrangement according to the present invention. Such an electronic device may be a portable electronic device, e.g., a portable communication device such as a mobile phone.

The shutter arrangement may be an integrated part of such electronic device or as an electronic device, e.g., a camera, connectable to a second electronic device such as a computer, a mobile phone, a sound/music playing device, or the like. Such connection may be in the form of cords, wires, wireless connection, such as a short range protocol, e.g., Bluetooth, alternatively internet or the like.

Such an electronic device preferably comprises a housing with an outer surface. When the second movable cover and the camera lens cover are in their first positions, the outer surfaces of the second movable cover and the camera lens cover are substantially aligned with the outer surface of the mentioned housing.

BRIEF DESCRIPTION OF THE DRAWINGS

Different embodiments of the present invention will be described in greater detail with reference to the accompanying figures in which.

DETAILED DESCRIPTION OF PREFERRED EMBODIMENTS

Figure 1:
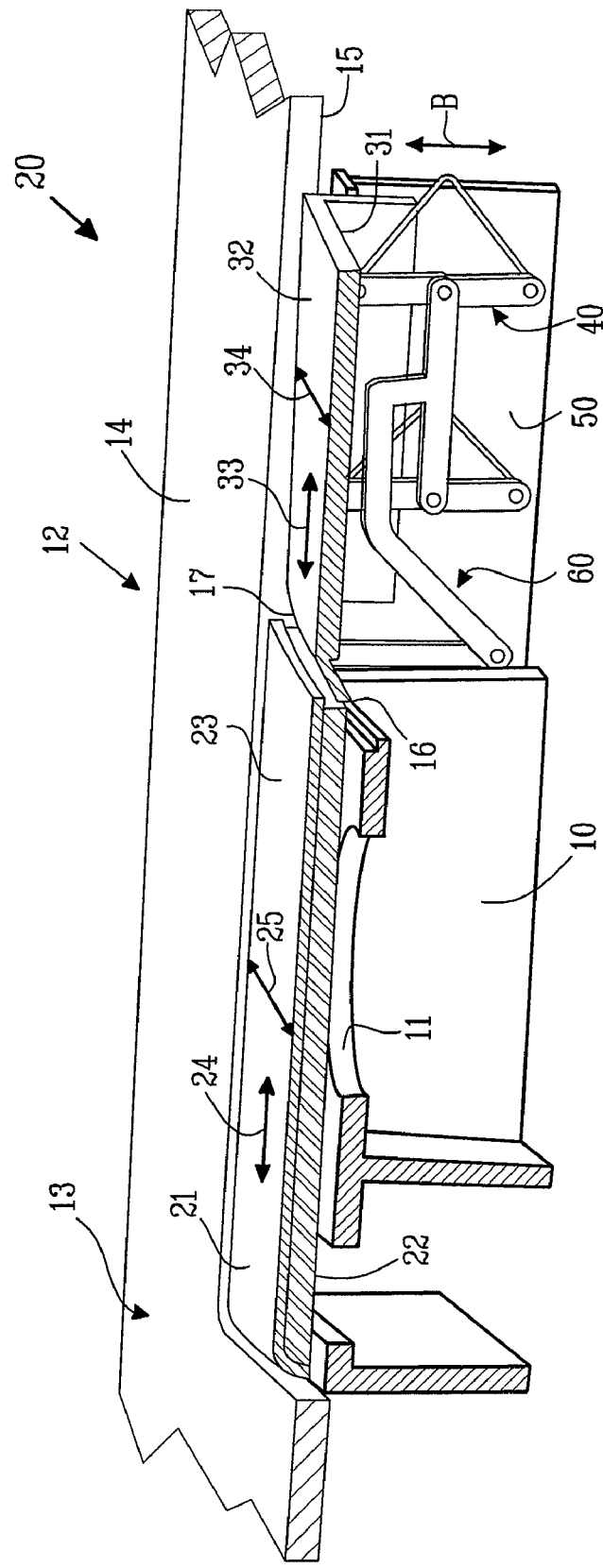
FIG. 1 shows a cross section of a mobile phone comprising a shutter arrangement, according to the present invention, when the camera lens cover is in the first position.

Turning to FIG. 1, FIG. 1 shows a cross section of a part of a camera housing 10 comprising a camera lens opening 11. Inside the camera housing 10 is at least a part of a camera (not shown) arranged so that the lens of the camera is arranged at the camera lens opening 11. The camera housing 10 may be arranged in an electronic device, preferably in a portable electronic device such as a communication device, e.g., a telephone, preferably a mobile phone, a sound device such as a music-player, e.g., an MP3-player, CD-player or DVD-player. It may further be a separate camera which may be attachable to, e.g., a communication device such as a telephone, e.g., directly, via cords, wires or via a short range communication protocol such as Bluetooth. It may further be arranged on a computer or on a computer accessory or the like. Preferably the camera housing is arranged in a communication device, preferably a mobile phone.

The camera housing 10 is, in the shown embodiment of the present invention, arranged in a mobile phone 12 comprising a phone housing 13. The phone housing 13 comprises an outer surface 14 and an inner surface 15. The phone housing 13 extends along a plane P.

A shutter arrangement 20 is arranged to at least partly cover the camera lens opening 11. The shutter arrangement comprises a camera lens cover 21 comprising an inner and an outer side 22, 23 while exhibiting a longitudinal extension 24 and a transverse extension 25. The camera lens cover 21 can be moved in the plane P between a first and a second position. As shown in FIG. 1, when the camera lens cover 21 is positioned to cover the camera lens opening 11, the camera lens cover 21 is in the first position. The camera lens cover 21 is further aligned with the plane P of the phone housing 13, so that the outer surface 23 of the camera lens cover 21 is substantially aligned, preferably aligned, with the outer surface 14 of the phone housing 13, preferably so that they coincide. Aspects described herein provide for, e.g., a phone housing 13 which does not have a shutter arrangement with a protruding lens cover which might get caught in clothes or similar. Further, the shutter arrangement is much less likely to be accidentally opened or to be subjected to external disruptive forces which could damage the shutter arrangement or the camera lens.

As mentioned, the camera lens cover 21 can be moved to the second position, in which the camera lens cover 21 substantially does not cover the camera lens opening 11. When the camera lens cover 21 is in the second position, the camera is ready for use, i.e., to take pictures. The camera lens cover 21 is moved along the plane P and the first direction A, between the first and the second position. In the shown embodiment, the first direction A is substantially parallel with the longitudinal extension 24 of the camera lens cover 21, in other embodiments of the present invention, the first direction A may be substantially parallel with the transverse extension 25 of the camera lens cover 21. In an embodiment of the present invention, the first direction A is substantially parallel with a direction between the longitudinal and transverse extension 24, 25 of the camera lens cover 21, such as a diagonal direction.

Figure 2:
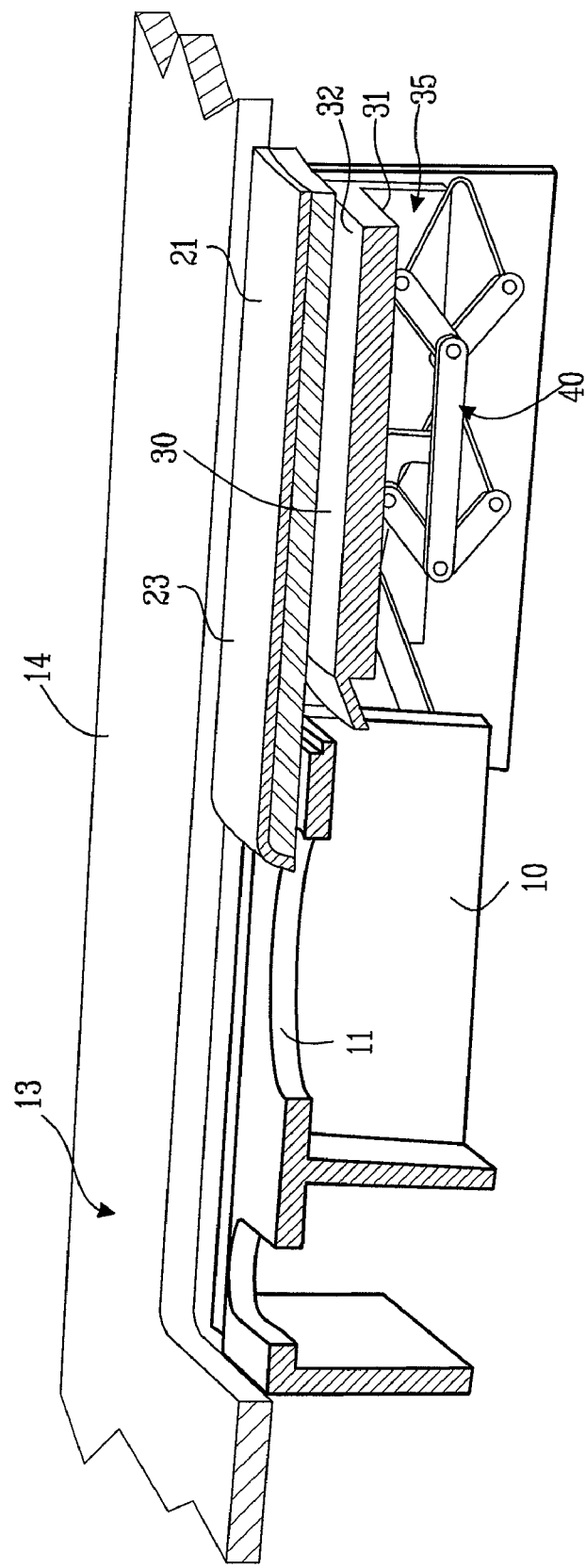
FIG. 2 shows the embodiment from FIG. 1, when the camera lens cover is in the second position.

The shutter arrangement 20 further comprises a second movable cover 30 (FIG. 2) arranged substantially aligned, preferably aligned, with the plane P of the phone housing 13 and arranged to intersect the first direction A. The second movable cover 30 comprises an inner and an outer surface 31, 32, a longitudinal extension and a transverse extension 33, 34 (shown in FIG. 1) and is substantially displaced from the camera lens opening 11. The second movable cover 30 is arranged substantially above a cover chamber 35. The purpose of the cover chamber 35 is to provide a temporary storage compartment for the second movable cover 30, when the camera lens cover 21 is in its second position. This provides for a phone housing 13 from which no protruding parts of the shutter arrangement 20 extends out beyond the outer surface 14 of the phone housing 13. When the second movable cover 30 is moved from its first position, in which the second movable cover 30 is substantially aligned with the plane P of the phone housing 13 and intersecting with the first direction A, to the second position, the second movable cover 30 is displaced from the first direction A, so as to permit the camera lens cover 21 to run along the first direction A. The second movable cover 30 is moved down into the cover chamber 35 along a second direction B when displaced from the first direction A. By displacing the second movable cover 30 down into the cover chamber 31 (as shown in FIG. 2), the shutter arrangement 20 is kept from protruding out from the plane P and the outer surface 14 of the phone housing 13.

Hence, while the camera lens cover 21 is arranged to be moved along the plane P and the first direction A, the second movable cover 30 is arranged to be moved between a first and a second position along a second direction B. The second direction B is substantially perpendicular, preferably perpendicular, to the first direction A. Although, as will be clear when reading the following description, the second direction B does not need to be perpendicular, but can alternatively be in a direction with an angle of less than 90 degrees with respect to the first direction A.

The second movable cover 30 is connected to a biasing mechanism 40. The purpose of the biasing mechanism 40 is to bias the second movable cover 30 towards the first position of the second movable cover 30. In the illustrated embodiment, a part of the biasing mechanism 40 is also arranged to prevent the second movable cover 30 from moving in the second direction B, until the camera lens cover 21 is moved along the first direction A. In that sense, the biasing mechanism 40 can also function as a lock mechanism. This mechanism will be described in greater detail with reference to FIGS. 3 and 4.

Further in FIG. 1, the second movable cover 30 may be equipped with an angled flange 16 extending from the edge 17 arranged adjacent the camera lens cover 21. The angled flange 16 extends from the outer surface 32 of the second movable cover 30 down towards the inner surface 31 of the second movable cover 30, so that the camera lens cover 21 will automatically force down the second movable cover 30, when moved along the first direction A. Although in this embodiment the second movable cover 30 is arranged with an angled surface, the camera lens cover 21 might be equipped with an angled surface appropriate for the same purpose.

Turning to FIG. 2, FIG. 2 shows the same embodiment as in FIG. 1. However, the camera lens cover 21 is moved to the second position, i.e., so that the lens opening 11 of the camera housing 10 is exposed and the camera device (not shown) is ready for photographing. The second movable cover 30 is also in the second position, inside the cover chamber 35, i.e., it has been displaced by means of the camera lens cover 21. While the second movable cover 30 is in the second position, as shown in FIG. 2, the camera lens cover 21 is still aligned with the plane P. More specifically, the outer surface 14 of the phone housing 13 is still aligned with the outer surface 23 of the second movable cover 30. The biasing mechanism 40 biases the second movable cover 30 towards its first position. The biasing force imparts a force to the camera lens cover 21 and thereby helps the camera lens cover 21 to remain in its second position until the user retracts the camera lens cover 21 to its first position, so as to cover the lens opening 11 of the camera housing 10. When the camera lens cover 21 is retracted, the second movable cover 30 is automatically returned to its first position by means of the bias mechanism.

As mentioned, the second movable cover 30 may be displaced by means of the camera lens cover 21, as will be described with reference to FIGS. 3 and 4. However, in an exemplary embodiment, the second movable cover 30 can only be moved to the second position by means of imparting a force in the direction of the second direction B to the outer surface of the second movable cover 30. In this embodiment, the second movable cover 30 functions as a locking mechanism in the sense that the camera lens cover 21 cannot be moved along the first direction A until the second movable cover 30 is moved along the second direction B and at least partly into the cover chamber 35. This embodiment is preferably not provided with an angled flange 16 as described earlier.

Figure 3:
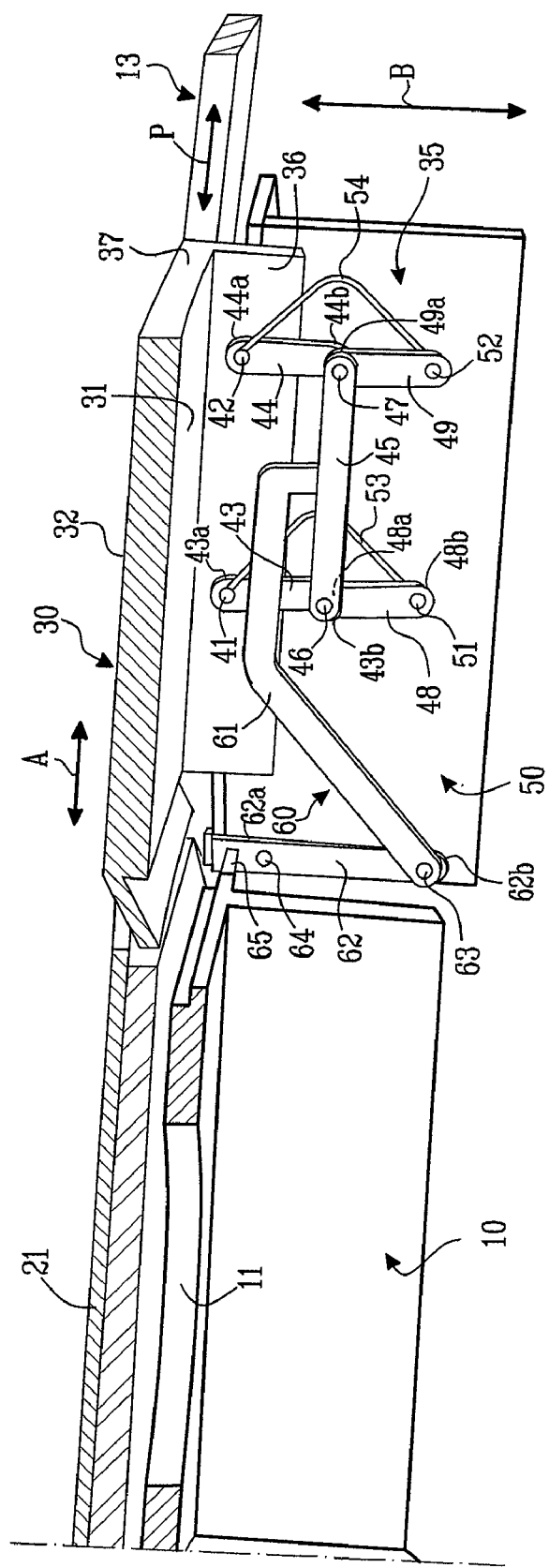
FIG. 3-4 shows the release mechanism and the bias mechanism comprising a lock mechanism in greater detail.

In FIG. 3 the bias mechanism 40 of the embodiment shown in FIGS. 1 and 2 will be described in greater detail. FIG. 3 shows a part of the camera lens cover 21 and the second movable cover 30, both being in their first position. A part of the camera housing 10 and the lens opening 11 is also visible. As can be seen, the second movable cover 30 comprises a supporting ridge 36 extending along the longitudinal extension 33, and in this embodiment, along at least one of the longitudinal edges 37 of the second movable cover 30. The ridge 36 extends in the second direction B, substantially perpendicular to the plane P out from the inner surface 31 of the second movable cover 30. The ridge 36 of the second movable cover 30 includes a first and a second attachment point 41, 42 at which the bias mechanism 40 is attached to the ridge 36 and the second movable cover 30. The first and second attachment points 41, 42 each comprises a pivot axis which extends through the ridge 36 as will be described in greater detail with reference to FIGS. 5 and 6.

The bias mechanism 40 comprises a first and a second rod 43, 44 respectively extending from the first and the second attachment point 41, 42 along the second direction B. The first and the second rods 43, 44 each comprise a first and a second end 43a, 43b, and 44a, 44b, respectively. Each first end 43a, 44a of the first and second rods 43, 44 is attached to the first and the second attachment point 41, 42. A horizontal connecting rod 45 pivotally connects the second ends 43b, 44b of the first and second rods 43, 44 at a third and a fourth attachment point 46, 47. From the third and the fourth attachment points 46, 47 are a third and a fourth rod 48, 49 pivotally attached, which extend along the second direction B. The third and the fourth rods 48, 49 each comprise a first and a second end 48a, 48b and 49a, 49b, respectively. The first ends 48a, 49a of the third and the fourth rods 48, 49 are attached to the third and the fourth attachment points 46, 47. The second ends 48b, 49b are pivotally fixed to a support frame 50 at a fifth and a sixth attachment point 51, 52. The support frame 50 could comprise a part of the phone housing 13 or any other fixed part which would be suitable for the purpose of fixing the bias mechanism 40. Preferably at least two such supports frames are present so as to provide stability to the second movable cover 30. The term "pivotally fixed" used herein should be construed to mean that the third and fourth rods 48, 49 can pivot around these points, but the fifth and the sixth attachment points 51, 52 cannot move, e.g., along the first direction A or the second direction B.

A first and a second bias rod 53, 54, respectively, extends between the first attachment points 41, 42 and the first ends 43a, 44a of the first and the second rods 43, 44, to the fifth and the sixth attachment points 51, 52 and the second ends 48b, 49b of the third and the fourth rods 48, 49. The first and the second bias rods 53, 54 can be made of spring steel, or other flexible material such as a polymeric composition, e.g., a thermoplastic material. Hence, the first bias rod 53 biases the first attachment point 41 away from the fifth attachment point 51, and the second bias rod 54 biases the second attachment point 42 away from the sixth attachment point 52. By making the first and the second bias rods 53, 54 slightly longer than the distance between the first and the fifth attachment points 41, 51 and the second and the sixth attachment points 42, 52, a bias force is imparted to the second movable cover 30. The just mentioned bias force will bias the second movable cover 30 towards alignment with the plane P and the phone housing 13.

The arrangement will, when the second movable cover 30 is in its first position, substantially prevent the second movable cover 30 from displacement along the direction B, when the second movable cover 30 is subjected to a force along the second direction B on the outer surface 32 of the second movable cover 30. A force imparted on the outer surface 32 of the second movable cover 30 will only impart a counterforce running along the first, second, third and fourth rods 43, 44, 48, 49 from the fifth and the sixth attachment points 51, 52, for as long as the first, second, third and fourth rods 43, 44, 48, 49 are kept substantially aligned. As soon as a minor force is imparted to the horizontal connection rod 45, an angle will be created between the first and the third rod 43, 48 and the second and the fourth rod 44, 49. Any force imparted to the second moveable cover 30 will at this stage no longer be met by a counterforce as described above, hence the second movable cover 30 can easily be moved down into the cover chamber 35.

In an exemplary embodiment, means to impart a force on the horizontal connection rod 45 comprises a release mechanism 60. The release mechanism 60 may comprise two pivotally joined rods, an extension rod 61 and a trigger rod 62. The extension rod 61 extends out from the center of the horizontal connecting rod 45, i.e., between the third and fourth attachment points 46, 47 which, in the shown embodiment of the present invention, are arranged at the ends of the horizontal connecting rod 45. From this point, the extension rod 61 may extend in a direction up towards the second movable cover 30, in a direction substantially perpendicular to the horizontal connecting rod 45, to thereafter turn in a substantially right-angled direction, to a direction substantially parallel with the horizontal connecting rod 45. The extension rod 61 thereafter extends a short distance past the horizontal connecting rod 45 to thereafter divert from the substantially parallel direction, away from the second movable cover 30, down to be aligned with the plane of the fifth and sixth attachment point 51, 52, at which the trigger rod 62 is joined to the extension rod 61 in an extension and trigger rod attachment point 63.

The trigger rod 62 is a straight rod, comprising a first and a second end 62a, 62b. The extension and trigger rod attachment point 63 is arranged in near proximity of the second end 62b of the trigger rod 62. The trigger rod 62 is pivotally attached to the support frame 50 at a leverage point 64, which is arranged closer to the first end 62a than the second end 62b of the trigger rod 62. The first end 62a forms a protruding section 65 and protrudes up to intersect the camera lens cover 21 and the first direction A.

Figure 4:
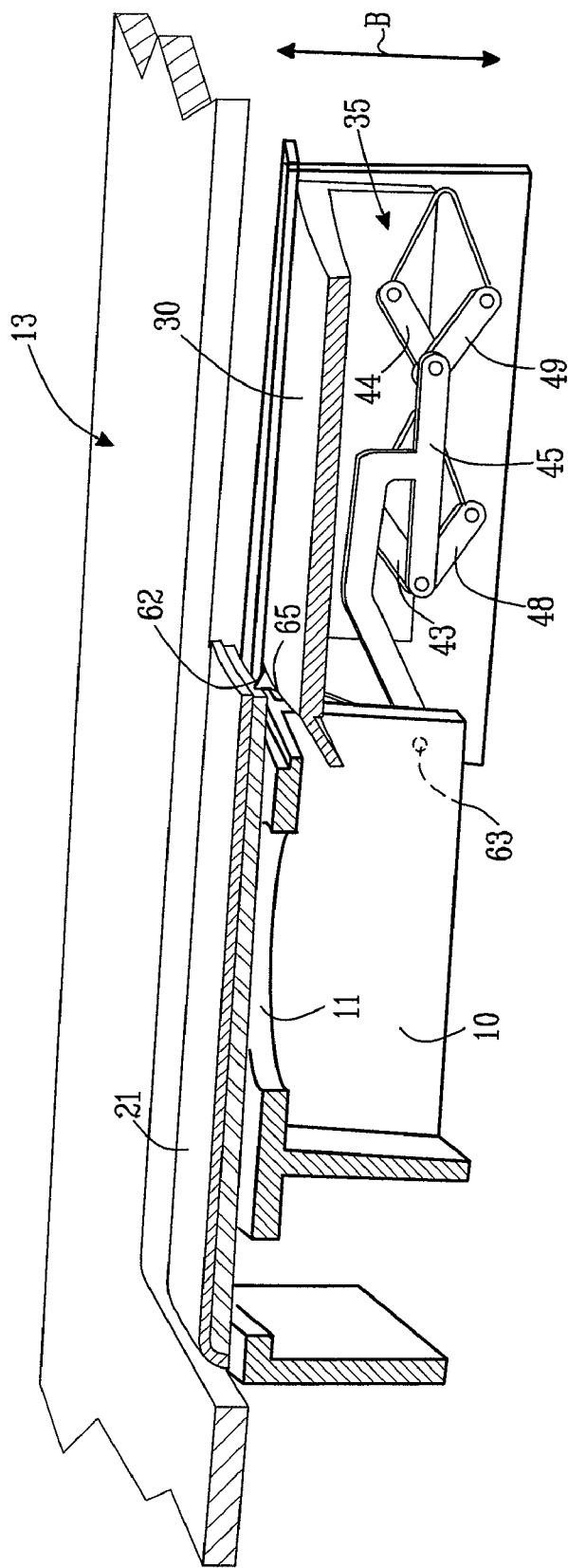

The cooperative function of the bias mechanism 40 and the release mechanism 60 will hereby be described with references to FIG. 4. As the camera lens cover 21 is moved along the first direction A, the protruding section 65 of the trigger rod 62 is displaced by the edge of the camera lens cover 21. As the protruding section 65 of the trigger rod 62 is displaced, the leverage point 64 (not shown in FIG. 4) provides leverage to the extension rod 61 via the extension and trigger rod attachment point 63, moving the horizontal connecting rod 45 substantially in a direction along the first direction A but towards the camera housing 10, so that the aligned first, second, third and fourth rods 43, 44, 48, 49 are imparted with a force, just enough to tilt the first and the third rods 43, 48 and the second and the fourth rods 44, 49 with respect to each other. The second movable cover 30 is then forced down into the cover chamber 35 by means of the camera lens cover 21 as the camera lens cover 21 is moved along the first direction A.

Figure 5:
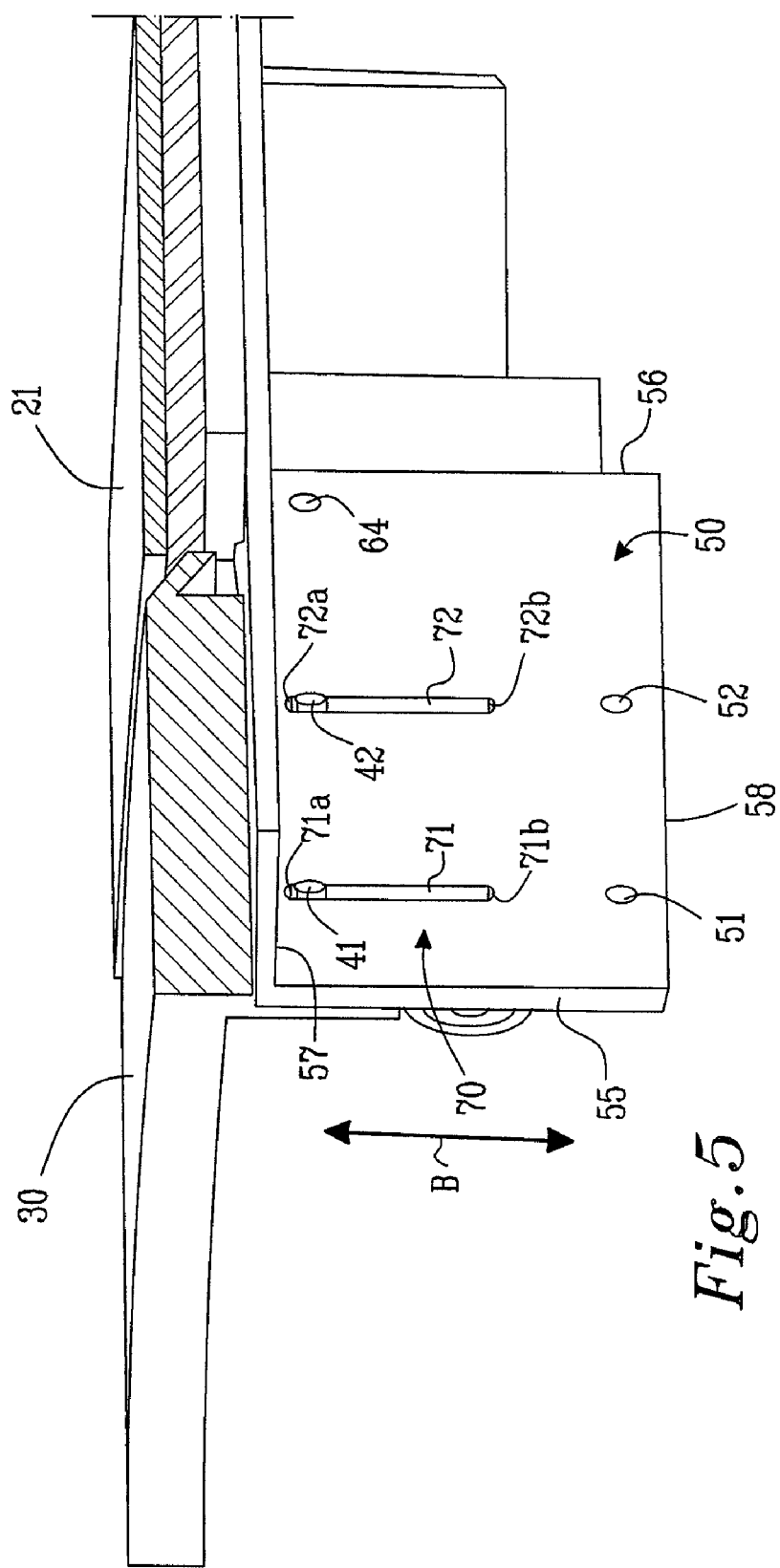
FIG. 5-6 shows the support frame in greater detail.

In FIG. 5, the support frame 50 is shown in greater detail, but without the partly shown phone housing 13. As can be seen, the camera lens cover 21 and the second movable cover 30 are in their first position, as shown in FIG. 1. The support frame 50 comprises a first and a second transverse end 55, 56 and a first and a second longitudinal end 57, 58. The support frame 50 may be attached to the inside of the phone housing 13, e.g., along the second longitudinal end 58, or any other place were appropriate attachment can be achieved. As mentioned before, the support frame 50 may exhibit other forms than the one described in this embodiment.

Further in FIG. 5, the leverage point 64 is attached to the support frame 50 in the proximity of the intersection between the first longitudinal end 57 and the second transverse end 56, with a through going axis. The fifth and the sixth attachment points 51, 52 are attached along the second longitudinal end 58 of the support frame 50, respectively by means of a through going axis.

The support frame 50 further comprises guiding means 70 in the form of a first and a second guiding channel 71, 72. Each first and second guiding channel 71, 72 respectively comprises a first and a second end 71a, 71b, 72a, 72b and extends longitudinally and parallel with the second direction B. The guiding means 70 guide the second movable cover 30 along the second direction B, or more specifically, prevents the second movable cover 30 from moving in any other direction than the second direction B. The first and the second attachment points 41, 42 each comprise a through going axis which runs in the first and second guiding channel 71, 72 so as to permit the second movable cover 30 to be positioned between the first and the second position.

Figure 6:
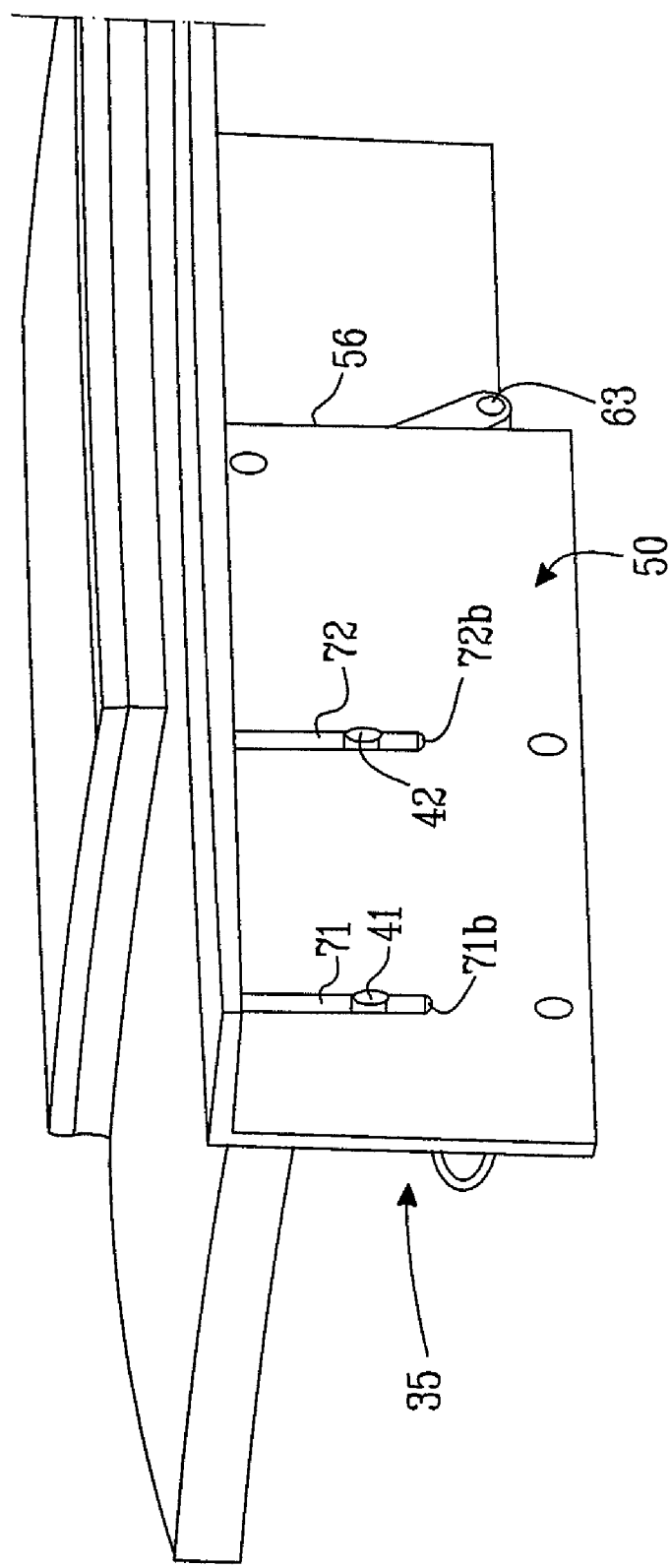

Turning to FIG. 6, as the second movable cover 30 is moved down into the cover chamber 35, the through going axis of the first and the second attachment points 41, 42 runs in the guiding channels 71, 72, as can be seen near the second ends 71b, 72b of the first and the second guiding channels 71, 72. Further in FIG. 6, the extension and trigger rod attachment point 63 can be seen to protrude past the second transverse end 56 of the support frame 50, as the release mechanism 60 (as shown in FIG. 3) has disabled the lock mechanism of the bias mechanism 40 so as to permit the second movable cover 30 to move down into the cover chamber 35.

As described above, the shutter arrangement 20 may comprise a bias mechanism to bias the second movable cover 30 towards the first position. The shutter arrangement 20 may also be provided with a release mechanism which deactivates a lock mechanism to the second moveable cover 30, the lock mechanism's main purpose being to prevent the second moveable cover 30 from movement along a second direction B. An example of such a mechanism has been described above.

It is well within the boundaries of the present invention that the bias mechanism can be in the form of a spring device, e.g., at least one spring, preferably at least two springs, which bias the second movable cover 30 towards its first position. As alternative, the bias mechanism can be in the form of polymeric foam, such as open or closed cell polymeric foam, e.g., polyurethane foam. Polymeric foam with appropriate thickness would provide for the appropriate bias means.

Figure 7:
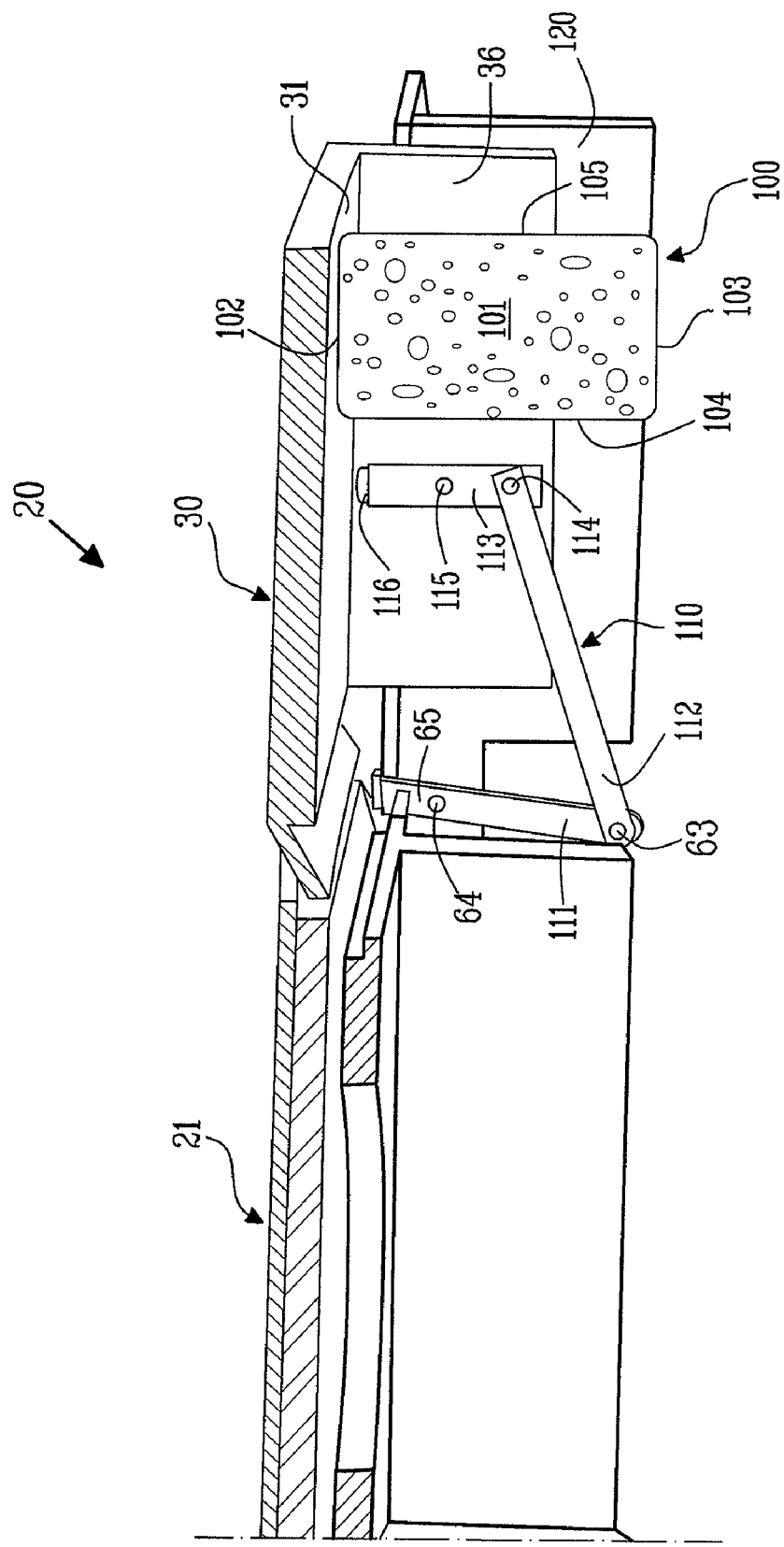
FIG. 7 shows an alternative release, lock and bias mechanism according to the present invention.

For the sake of clarity when referring to FIG. 7, items that are substantially identical are referred to with the same reference numbers as to the earlier figures. In FIG. 7 is an alternative bias mechanism 100 shown in the form of closed cell polymeric foam 101. Polymeric foam according to the present invention should have a recovery property in the sense that it will recover its original dimensions after being subjected to pressure. These polymeric foams are conventional and will not be described in greater detail. The polymeric foam 101 comprises a first and a second transverse end 102, 103 each representing a surface with a cross section. The polymeric foam 101 further comprises a first and a second longitudinal side 104, 105. The first transverse end 102 is arranged to the inner surface 31 of the second movable cover 30, and the second transverse end 103 is attached to, e.g., the inside of the phone housing (not shown), so as to bias the second movable cover 30 towards its first position.

Further in FIG. 7 is a release mechanism 110 arranged in working cooperation with the camera lens cover 21 as described earlier with the means of a protruding section 65. The release mechanism 110 comprises a trigger rod 111 and an alternative extension rod 112 connected to a locking rod 113 via a locking rod pivot axis 114. The trigger rod 111 is attached to a part of a support frame 120 via a leverage point 64, just as in earlier embodiments, and connected to the alternative extension rod 112 via an extension and trigger rod attachment point 63.

The locking rod 113 is however in this embodiment pivotally fixed to the support frame 120 at a locking rod attachment point 115. The locking rod attachment point 115 runs freely in a guiding channel 116 arranged in the ridge 36 of the second movable cover 30.

For all the above mentioned embodiments of the present invention, during use, a user can manually bias the camera lens cover with his/hers hand. The bias force imparted to a release mechanism will thereafter impart leverage to a locking mechanism which may, or may not form a part of a bias mechanism. When the locking mechanism is disabled, the second movable cover is free to move down into a cover chamber so that the camera lens cover may run uninterrupted along a first direction A, between its first (closed) position and its second (opened) position.

FIGS. 1-7 show a cross section of the shutter arrangement, according to an embodiment of the present invention. In other embodiments, however, a symmetrical second bias, release and lock mechanism may be used, as illustrated in FIG. 8.

Figure 8:
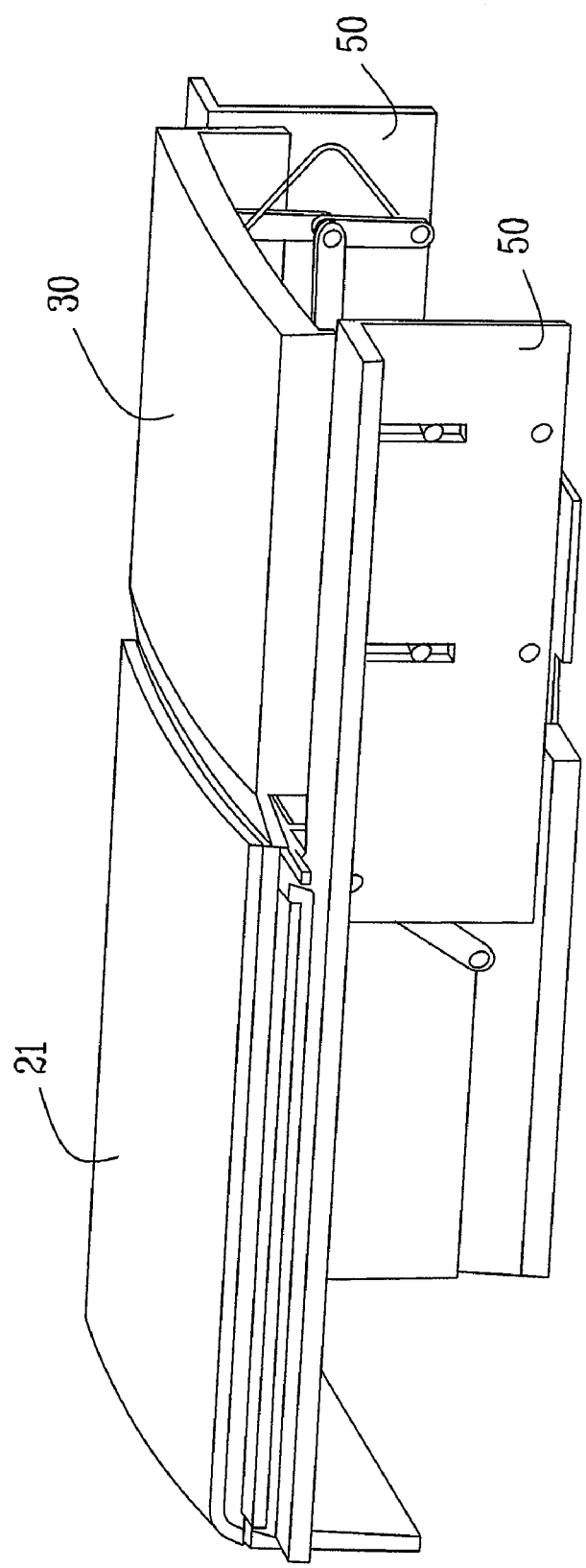
FIG. 8 shows a shutter arrangement in perspective.

FIG. 8 shows a camera lens cover 21 and a second movable cover 30 connected to a first and a second support cover 50. Each support cover 50 respectively comprise a release, lock and bias mechanisms as described above with respect to FIGS. 1-6.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

The invention claimed is:

1. A shutter arrangement for at least partly covering a camera lens, comprising:
   a camera lens cover, said camera lens cover being movable in a plane along a first direction between a first closed position, in which said camera lens cover substantially covers said camera lens, and a second opened position, in which said camera lens is substantially uncovered from said camera lens cover; and
   a second movable cover, said second movable cover being movable between a first position, in which said second movable cover substantially intersects said plane and said first direction, to a second position, in which said second movable cover is substantially displaced from said plane and said first direction, said camera lens cover overlapping said second movable cover when said camera lens cover is in said second opened position and said second movable cover is in said second position, where the second movable cover comprises an outer surface and said camera lens cover comprises an outer surface, and when the second movable cover is in said first position and said camera lens cover is in said first closed position, said outer surfaces of the second movable cover and the camera lens cover are substantially aligned.

2. The shutter arrangement according to claim 1, where the second movable cover is coupled to a bias mechanism to bias said second movable cover towards said first position of said second movable cover.

3. The shutter arrangement according to claim 2, where the bias mechanism comprises a spring means, a bias rod, or a compressible foam material.

4. The shutter arrangement according to claim 1, where the shutter arrangement further comprises:
   a lock mechanism to lock said second movable cover in the first position.

5. The shutter arrangement according to claim 4, where the shutter arrangement further comprises:
   a release mechanism coupled to said lock mechanism, said release mechanism being configured to disable said lock mechanism when said camera lens cover is moved towards the second position.

6. The shutter arrangement according to claim 5, where the release mechanism comprises a trigger rod which at least partly intersects the first direction.

7. The shutter arrangement according to claim 1, where the second movable cover is displaced along a second direction.

8. The shutter arrangement according to claim 7, where the second direction is substantially perpendicular to the first direction.

9. The shutter arrangement according to claim 1, further comprising:
   a cover chamber into which said second movable cover is moved when displaced from said first direction.

10. A portable electronic device comprising:
    a shutter arrangement for at least partly covering a camera lens, the shutter arrangement comprising:
    a camera lens cover, said camera lens cover being movable in a plane along a first direction between a first closed position, in which said camera lens cover substantially covers said camera lens, and a second opened position, in which said camera lens is substantially uncovered from said camera lens cover,
    a second movable cover, said second movable cover being movable between a first position, in which said second movable cover substantially intersects said plane and said first direction, to a second position, in which said second movable cover is substantially displaced from said plane and said first direction, where said camera lens cover overlaps said second movable cover when said camera lens cover and said second movable cover are in said second position, and
    a housing with an outer surface, and when the second movable cover and the said camera lens cover are in their first positions, outer surfaces of the second movable cover and the camera lens cover are substantially aligned with the outer surface of the housing.

11. The portable electronic device according to claim 10, where the portable electronic device comprises a portable communication device.

12. The portable electronic device according to claim 11, where the portable communication device comprises a mobile phone.

13. The portable electronic device according to claim 10, where the electronic device comprises a camera device connectable to a second electronic device.

14. The portable electronic device of claim 13, where the second electronic device comprises at least one of a computer, a mobile phone or a music playing device.

* * * * *